US009776151B2

(12) United States Patent
Chakraborty et al.

(10) Patent No.: US 9,776,151 B2
(45) Date of Patent: *Oct. 3, 2017

(54) METHOD OF PREPARING POLYCRYSTALLINE DIAMOND FROM DERIVATIZED NANODIAMOND

(75) Inventors: Soma Chakraborty, Houston, TX (US); Gaurav Agrawal, Aurora, CO (US); Bennett Richard, Kingwood, TX (US); Anthony A. DiGiovanni, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1079 days.

This patent is subject to a terminal disclaimer.

(21) Appl. No.: 13/077,426

(22) Filed: Mar. 31, 2011

(65) Prior Publication Data

US 2011/0252711 A1    Oct. 20, 2011

Related U.S. Application Data

(60) Provisional application No. 61/324,142, filed on Apr. 14, 2010.

(51) Int. Cl.
*B01J 3/06*         (2006.01)
*B24D 18/00*     (2006.01)
(Continued)

(52) U.S. Cl.
CPC ............ *B01J 3/062* (2013.01); *B24D 99/005* (2013.01); *B82Y 30/00* (2013.01); *C01B 31/065* (2013.01); *C04B 35/52* (2013.01); *C04B 35/6303* (2013.01); *C04B 35/645* (2013.01); *C04B 37/02* (2013.01); *B01J 2203/062* (2013.01); *B01J 2203/0655* (2013.01);
(Continued)

(58) Field of Classification Search
None
See application file for complete search history.

(56) References Cited

U.S. PATENT DOCUMENTS 3,745,623 A    7/1973   Wentorf, Jr. et al.
4,224,380 A    9/1980   Bovenkerk et al.
(Continued)

FOREIGN PATENT DOCUMENTS

CN    1954042 A       4/2007
JP    2008115303 A    5/2008
(Continued)

OTHER PUBLICATIONS

Krueger; Diamond Nanoparticles: Jewels for Chemistry and Physics; Ad. Mater.; 20, 2445-2449; 2008.*
(Continued)

*Primary Examiner* — Guinever S Gregorio
(74) *Attorney, Agent, or Firm* — Cantor Colburn LLP (57) ABSTRACT

A method of forming a polycrystalline diamond comprises derivatizing a nanodiamond to form functional groups, and combining the derivatized nanodiamond with a microdiamond having an average particle size greater than that of the derivatized nanodiamond, and a metal solvent-catalyst. A polycrystalline diamond compact is prepared by adhering the polycrystalline diamond to a support, and an article such as a cutting tool may be prepared from the polycrystalline diamond compact.

27 Claims, 5 Drawing Sheets

(51) Int. Cl.
*B82Y 30/00* (2011.01)
*C01B 31/06* (2006.01)
*C09K 3/14* (2006.01)
*C04B 35/52* (2006.01)
*C04B 35/63* (2006.01)
*C04B 37/02* (2006.01)
*B24D 99/00* (2010.01)
*C04B 35/645* (2006.01)

(52) U.S. Cl.
CPC .......... *B01J 2203/0685* (2013.01); *C04B 2235/3206* (2013.01); *C04B 2235/3208* (2013.01); *C04B 2235/3215* (2013.01); *C04B 2235/386* (2013.01); *C04B 2235/3826* (2013.01); *C04B 2235/3847* (2013.01); *C04B 2235/422* (2013.01); *C04B 2235/427* (2013.01); *C04B 2235/5248* (2013.01); *C04B 2235/5288* (2013.01); *C04B 2235/5436* (2013.01); *C04B 2235/5445* (2013.01); *C04B 2235/5454* (2013.01); *C04B 2235/5472* (2013.01); *C04B 2237/363* (2013.01); *C04B 2237/401* (2013.01)

(56) References Cited

U.S. PATENT DOCUMENTS

| | | | |
|---|---|---|---|
| 4,903,164 A | 2/1990 | Bishop et al. | |
| 5,127,923 A | 7/1992 | Bunting et al. | |
| 5,662,183 A | 9/1997 | Fang | |
| 6,045,440 A | 4/2000 | Johnson et al. | |
| 6,220,375 B1 | 4/2001 | Butcher et al. | |
| 6,302,405 B1 | 10/2001 | Edwards | |
| 6,655,234 B2 | 12/2003 | Scott | |
| 6,655,845 B1 | 12/2003 | Pope et al. | |
| 6,951,578 B1 | 10/2005 | Belnap et al. | |
| 7,348,298 B2 | 3/2008 | Zhang et al. | |
| 7,419,941 B2 | 9/2008 | Waynick | |
| 7,449,432 B2 | 11/2008 | Lockwood et al. | |
| 7,516,804 B2 | 4/2009 | Vail | |
| 7,628,234 B2 | 12/2009 | Middlemiss | |
| 7,635,035 B1 | 12/2009 | Bertagnolli et al. | |
| 8,118,896 B2 | 2/2012 | Can et al. | |
| 8,147,790 B1* | 4/2012 | Vail | C22C 26/00 175/425 |
| 2005/0136667 A1 | 6/2005 | Sung | |
| 2005/0158549 A1* | 7/2005 | Khabashesku et al. | 428/403 |
| 2005/0161212 A1 | 7/2005 | Leismer et al. | |
| 2007/0036896 A1 | 2/2007 | Sung et al. | |
| 2008/0127475 A1 | 6/2008 | Griffo | |
| 2008/0168717 A1 | 7/2008 | Can et al. | |
| 2008/0209818 A1 | 9/2008 | Belnap et al. | |
| 2009/0158670 A1 | 6/2009 | Vail | |
| 2009/0178345 A1 | 7/2009 | Russell et al. | |
| 2009/0218276 A1 | 9/2009 | Linford et al. | |
| 2010/0041315 A1 | 2/2010 | Sung | |
| 2010/0187925 A1 | 7/2010 | Tingler et al. | |
| 2011/0088954 A1* | 4/2011 | Digiovanni | C04B 35/52 175/336 |

FOREIGN PATENT DOCUMENTS

| | | |
|---|---|---|
| WO | 2006032984 A2 | 3/2006 |
| WO | 2008130431 A2 | 10/2008 |
| WO | 2009/048268 A2 | 4/2009 |
| WO | 2011046838 A2 | 4/2011 |
| WO | 2011130023 A2 | 10/2011 |

OTHER PUBLICATIONS

Cleveland, et al.; "Raman Spectrum of 1-Bromo-Dodecane"; Journal of Chemical Physics; 8; pp. 867-868; (1940).
Gaurav Saini et al., "Core-Shell Diamond as a Support for Solid-Phase Extraction and High-Performance Liquid Chromatography", Anal. Chem, 2010, vol. 82, No. 11, pp. 4448-4456.
U.S. Appl. No. 61/373,617, filed Aug. 13, 2010, Cutting Elements Including Nanoparticles in at Least One Portion Thereof, Earth-Boring Tools Including Such Cutting Elements, and Related Methods.
International Search Report and Written Opinion; International Application No. PCT/US2011/030924; International Filing Date: Apr. 1, 2011; Date of Mailing: Dec. 27, 2011; 9 pages.
International Search Report and Written Opinion; International Application No. PCT/US2011/032502; International Filing Date: Apr. 14, 2011; Mailing Date: Dec. 27, 2011; 10 pages.
European Search Report for EP Application No. 11769591.6 dated Dec. 12, 2013.

* cited by examiner

METHOD OF PREPARING POLYCRYSTALLINE DIAMOND FROM DERIVATIZED NANODIAMOND

CROSS REFERENCE TO RELATED APPLICATION

This application is a non-provisional application claiming the benefit of provisional U.S. Application No. 61/324,142, filed on Apr. 14, 2010, which is incorporated herein by reference in its entirety.

BACKGROUND

Earth-boring tools for forming boreholes in subterranean earth formations such as for example for hydrocarbon production, carbon dioxide sequestration, etc. generally include a plurality of cutting elements secured to a body. For example, fixed-cutter earth-boring rotary drill bits (also referred to as "drag bits") include cutting elements that are fixed to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit.

Use of drill bits having superabrasive drilling surfaces can afford improved performance in such down-hole environments. In particular, polycrystalline diamond compacts (PDCs) formed of small (e.g., micron-sized) diamond grains fused and bonded together by a high temperature, high pressure process using a metal catalyst, and supported on a ceramic substrate, can be incorporated onto a drill bit. Such drill bits have been found to provide a superabrasive abrasive surface which is capable of cutting through hard rock for extended periods of time, and under severe down-hole conditions of temperature, pressure, and corrosive down-hole environments, while maintaining the integrity and performance of the drill bit.

Polycrystalline diamond compact cutting elements in which the catalyst material remains in the diamond table are generally thermally stable up to a temperature of about 750° C., although internal stress within the cutting element may begin to develop at temperatures exceeding about 400° C. from phase changes in the metal catalyst (e.g., cobalt, which undergoes a transition from the beta-phase to the alpha-phase) and/or differences in the thermal expansion of the diamond grains and the catalyst metal at the grain boundaries. Hence, over time, such PDC drill bits are still subject to cumulative failure modes. In the course of drilling, cutting elements can wear, fracture, or accumulate damage that can alter, limit, or significantly degrade their performance in the application to which they were applied. Degradation of cutter performance can cause delays in the drilling process, increasing the overall cost of producing the well.

SUMMARY

In an embodiment, a method of forming a polycrystalline diamond comprises derivatizing a nanodiamond to form functional groups, and combining the derivatized nanodiamond with a microdiamond having an average particle size greater than that of the derivatized nanodiamond, and a metal solvent-catalyst.

In another embodiment, a method of making an article, comprises forming a superabrasive polycrystalline diamond compact by combining a nanodiamond derivatized to include functional groups, a microdiamond having an average particle size greater than that of the derivatized nanodiamond, and a metal solvent-catalyst; combining the polycrystalline diamond with a substrate comprising a ceramic; and removing a portion of the metal solvent-catalyst from the polycrystalline diamond compact by leaching.

In another embodiment, a method of forming a polycrystalline diamond comprises processing a suspension under heat and pressure, the suspension comprising as components: a nanodiamond having an average particle size of 1 to 500 nm and derivatized to include functional groups comprising alkyl, alkenyl, alkynyl, carboxyl, hydroxyl, amino, amido, epoxy, keto, alkoxy, ether, ester, lactones, metallic groups, organometallic groups, polymeric groups, or a combination comprising at least one of the foregoing, a microdiamond having an average particle size greater than that of the derivatized nanodiamond, a metal catalyst, a solvent, and a binder, wherein the components are more homogeneously distributed throughout the suspension than when a non-derivatized nanodiamond is included in place of the derivatized nanodiamond.

BRIEF DESCRIPTION OF THE DRAWINGS

Referring now to the drawings.

DETAILED DESCRIPTION

Disclosed herein is a novel method of forming a polycrystalline diamond. As used herein, the term "polycrystalline" means a material (e.g., diamond or diamond composite) comprising a plurality of particles (i.e., crystals) that are bonded directly together by interparticle bonds. The crystal structures of the individual grains of the material may be randomly oriented in space within the polycrystalline material.

It has been found that derivatizing a nanodiamond to include functional groups and suspending in a solvent and/or water the derivatized nanodiamond with other components of the polycrystalline diamond such as a larger diamond particle (e.g., a microdiamond) and a metal for catalyzing carbon-carbon bonding during diamond formation, affords a precursor suspension when combined with a solvent in which the components are uniformly distributed. The derivatized nanodiamond has a greater affinity to its environment while suspended and remains suspended longer than a non-derivatized nanodiamond, or one which has been co-suspended with a dispersant.

From this suspension, a precursor compact can be prepared, and after subsequent thermal (at least 1,000° C.) and pressure (at least 5 gigapascals (GPa)) treatment followed by catalyst removal, the resulting polycrystalline diamond has a highly uniform structure which has increased resistance to wear and degradation resulting from use in e.g., a drilling application. Such a polycrystalline diamond, and a PDC and cutting tool (e.g., a drill bit) prepared from the polycrystalline diamond, has a longer effective useful life than a similarly prepared polycrystalline diamond prepared without a derivatized nanodiamond.

The polycrystalline diamond, prepared by the method herein, includes a nanodiamond that has been derivatized, a microdiamond, and a metal solvent-catalyst. Additional components, such as nanoparticles not identical to the derivatized nanodiamonds, and microparticles not identical to the microdiamonds, may be included.

Nanodiamonds are diamond particles having an average particle size of less than one micrometer (μm). As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. Nanodiamonds as disclosed herein include generally diamond particles having an average particle size of 1 nanometer (nm) to less than 1 μm, and include both diamond particles having an average particle size of 250 nm or less (sometimes referred to in the art as "nanodiamonds"), and diamond particles having an average particle size of greater than 250 nm to less than 1 μm (sometimes referred to in the art as "sub-micron sized" diamond particles). In an embodiment, a nanodiamond may have an average particle size of about 0.01 to about 500 nanometers (nm), specifically 0.1 to 250 nm, more specifically about 1 to about 150 nm, more specifically about 10 to about 125 nm, and still more specifically about 25 to about 100 nm. The nanodiamonds may be monodisperse, where all particles are of the same size with little variation, or polydisperse, where the particles have a range of sizes and are averaged. Generally, polydisperse nanodiamonds are used. Nanodiamonds of different average particle size may be used, and in this way, the particle size distribution of the nanodiamonds may be unimodal (exhibiting a single distribution), bimodal exhibiting two distributions, or multi-modal, exhibiting more than one particle size distribution, where there is a gradient in particle size.

The minimum particle size for the smallest 5 percent of the nanodiamonds may be less than 0.1 nm, specifically less than or equal to 0.05 nm, and more specifically less than or equal to 0.01 nm. Similarly, the maximum particle size for 95% of the nanodiamonds is greater than or equal to 900 nm, specifically greater than or equal to 750 nm, and more specifically greater than or equal to 500 nm.

The nanodiamonds used herein may be from a naturally occurring source, such as a by-product of milling or other processing of natural diamonds, or may be synthetic, prepared by any suitable commercial method such as, but not limited to, high-pressure high-temperature (HPHT), explosive shock (also referred to as detonation, abbreviated DTD), chemical vapor deposition (CVD), physical vapor deposition (PVD), ultrasonic cavitation, and the like. Nanodiamonds may be used as received, or may be sorted and cleaned by various methods to remove contaminants and non-diamond carbon phases that may be present, such as residues of amorphous carbon or graphite.

The nanodiamonds used herein are derivatized to introduce functional groups to the nanodiamond. The derivatized nanodiamond includes functional groups comprising alkyl, alkenyl, alkynyl, carboxyl, hydroxyl, amino, amido, epoxy, keto, alkoxy, ether, ester, lactones, metallic groups, organometallic groups, polymeric groups, ionic groups, or a combination comprising at least one of the foregoing. Alternatively, or in addition, the microdiamond may be derivatized with the foregoing functional groups.

In an embodiment, nanodiamond can be derivatized by oxidative methods to produce carboxylic acid functional groups which carry a negative charge. In another embodiment, the nanodiamond can be further derivatized by grafting certain polymer chains which may be neutral in charge, or which can carry either a negative or positive charge by adjusting the pH value of its aqueous solution. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), may be included by derivatization of the nanodiamond.

Figure 1:
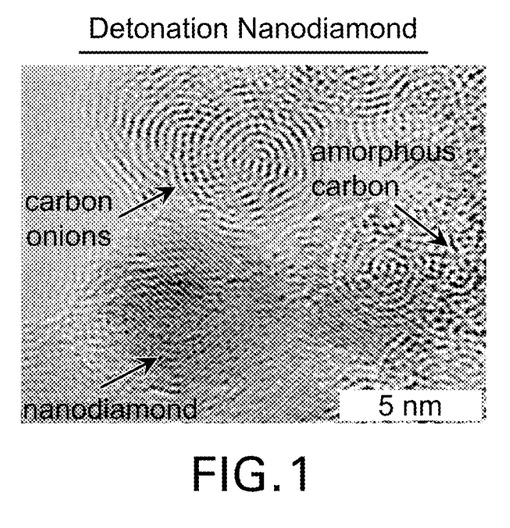
FIG. 1 is a transmission electron microscopy (TEM) image of an exemplary nanodiamond showing a nanodiamond core, carbon onions, and amorphous carbon region.

It will be appreciated that the nanodiamond being functionalized includes, in addition to a diamond lattice core, a shell or surrounding region of a graphitic compositions including amorphous carbon and an ordered graphitic region sometimes referred to as a "carbon onion." FIG. 1 is a transmission electron microscopy (TEM) image of an exemplary nanodiamond showing a nanodiamond core, carbon onions, and amorphous carbon region. The carbon onion may surround the diamond lattice core and may be attached to the core by covalent bonds or by a dispersion mechanism. The amorphous carbon region and especially the carbon onion region of the nanodiamond are believed to include sites of unsaturation (e.g., double bonds) which react under conditions of functionalization to form functional groups.

Introduction of functional groups by derivatizing the unsaturated functionality associated with the amorphous and carbon onion regions of a nanodiamond may be effected by any of numerous known methods for direct carbon-carbon bond formation to a double bond, or by linking to a functional group derived from an olefin. Exemplary methods of functionalizing may include, but are not limited to, reactions such as oxidation or oxidative cleavage of double bonds to form alcohols, diols, or carbonyl groups including aldehydes, ketones, or carboxylic acids; diazotization of double bonds proceeding by the Sandmeyer reaction; intercalation/metallization of the nanodiamond by treatment with a reactive metal such as an alkali metal including lithium, sodium, potassium, and the like, to form an anionic intermediate, followed by treatment with a molecule capable of reacting with the metalized nanodiamond such as a carbonyl-containing species (carbon dioxide, carboxylic acids, anhydrides, esters, amides, imides, etc.), an alkyl species having a leaving group such as a halide (Cl, Br, I), a tosylate, a mesylate, or other reactive esters such as alkyl halides, alkyl tosylates, etc.; molecules having benzylic functional groups; use of transmetalated species with boron, zinc, or tin groups which react with e.g., aromatic halides in the presence of catalysts such as palladium, copper, or nickel, which proceed via mechanisms such as that of a Suzuki coupling reaction or the Stille reaction; pericyclic reactions (e.g., 3 or 4+2) or thermocyclic (2+2) cycloadditions of other olefins, dienes, heteroatom substituted olefins, or the like.

In other embodiments, the nanodiamond may be treated to remove the outermost carbon onion prior to derivatizing. Where a treated nanodiamond is derivatized, initial derivatization to include a functional group may be accomplished by, for example, direct halogenations using a method of halogenation such as free-radical halogenation to include e.g., bromine atoms, followed by hydrolysis to the alcohol, or direct metallization, and further functionalized by for example ether synthesis or alkylation; introduction of oxygen functional groups such as alcohols or ketones by, for example, nitration followed by hydrolysis; or the like.

It will be appreciated that the above methods are intended to illustrate the concept of introducing functional groups to a nanodiamond, and should not be considered as limiting to such methods.

The polycrystalline diamond further comprises a microdiamond. Microdiamonds are diamond particles having an average particle size of greater than or equal to 1 micrometer ($\mu m$). In an embodiment, the average particle size of the microdiamond is about 1 $\mu m$ to about 250 $\mu m$, specifically about 2 $\mu m$ to about 200 $\mu m$, and more specifically about 1 $\mu m$ to about 150 $\mu m$.

As with the nanodiamonds above, the microdiamonds may be monodisperse, where all particles are of the same size with little variation, or polydisperse, where the particles have a range of sizes and are averaged. Generally, polydisperse microdiamonds are used. Microdiamonds of different average particle size, monodisperse or polydisperse or both, may be used, and the particle size distribution of the microdiamonds may be unimodal bimodal, or multi-modal. Microdiamonds, as with the nanodiamonds, may be used as received, or may be sorted and cleaned by various methods to remove contaminants and non-diamond carbon phases that may be present, such as residues of amorphous carbon or graphite.

The minimum particle size for the smallest 5 percent of the microdiamonds may be less than 0.1 $\mu m$, specifically less than or equal to 0.05 $\mu m$, and more specifically less than or equal to 0.01 $\mu m$. Similarly, the maximum particle size for 95% of the microdiamond is greater than or equal to 1,000 $\mu m$, specifically greater than or equal to 750 $\mu m$, and more specifically greater than or equal to 500 $\mu m$.

It will be understood that the average particle sizes of the derivatized nanodiamond is less than that of the microdiamond. In an embodiment, the average particle size of the microdiamond is at least about 10 times greater, specifically about 25 times greater, more specifically about 50 times greater, and still more specifically about 100 times greater than the average particle size of the derivatized nanodiamond. In another embodiment, the average particle size of the derivatized nanoparticle is about 150 times greater, and specifically about 250 to about 750 times greater than the average particle size of the derivatized nanodiamond.

The polycrystalline diamond comprises 0.001 to 90 wt % of derivatized nanodiamond based on the total weight of the derivatized nanodiamond, microdiamond, and metal solvent-catalyst. In a specific embodiment, the polycrystalline diamond comprises 0.01 to 70 wt %, and more specifically 0.1 to 50 wt % of derivatized nanodiamond based on the total weight of the derivatized nanodiamond, microdiamond, and metal solvent-catalyst. In an exemplary embodiment, the derivatized nanodiamond may be present in an amount of more specifically 0.1 to 10 wt %, based on the total weight of the derivatized nanodiamond, microdiamond, and metal solvent-catalyst.

In an embodiment, the polycrystalline diamond may further include a nanoparticle not identical to the derivatized nanodiamond, a microparticle not identical to the microdiamond, or a combination comprising at least one of the foregoing. In a further embodiment, the nanoparticle and/or microparticle may optionally be derivatized to have the aforementioned functional groups.

As used herein, the term "nanoparticle" means and includes any particle having an average particle size of about 1 $\mu m$ or less. Nanoparticles may include, for example fullerenes, nanographite, nanographene, graphene oxide, nanotubes, nanodiamonds including nano-sized and submicron sized diamond particles, diamondoids, polysilsesquioxanes, nanoclays, an inorganic nanoparticle including a metal or metalloid carbide, a metal or metalloid nitride, a metal carbonate, a metal bicarbonate, a metal oxide (ceramic), a metal nanoparticle, or combinations comprising at least one of the foregoing.

In an embodiment, nanoparticles used herein may have an average particle size of about 0.01 to about 500 nm, specifically 0.1 to 250 nm, and more specifically about 1 to about 150 nm. While it will be understood that the nanoparticles, including the nanodiamonds disclosed hereinabove, may be spherical, symmetrical, irregular, or elongated in shape and may have a low aspect ratio (i.e., largest dimension to smallest dimension) of less than 10 and approaching 1 in a spherical particle, in other embodiments the nanoparticle may have a two-dimensional aspect ratio (i.e., diameter to thickness for elongated nanoparticles such as nanotubes or diamondoids; or ratios of length to width, at an assumed thickness or surface area to cross-sectional area for plate-like nanoparticles such as, for example, nanographene or nanoclays) of greater than or equal to 10, specifically greater than or equal to 100, more specifically greater than or equal to 200, and still more specifically greater than or equal to 500. Similarly, the two-dimensional aspect ratio for such nanoparticles may be less than or equal to 10,000, specifically less than or equal to 5,000, and still more specifically less than or equal to 1,000.

Nanoparticles, where included, may displace a corresponding amount of derivatized nanodiamond. Thus in an embodiment, where an additional nanoparticle is used, the nanoparticle may be present relative to the derivatized nanodiamond in a ratio of 0:100 to 99:1, specifically 5:95 to 95:5, more specifically 10:90 to 90:10, and still more specifically 25:75 to 75:25, based on the weights of derivatized nanodiamond to nanoparticle.

Fullerenes, as disclosed herein, may include any of the known cage-like hollow allotropic forms of carbon possessing a polyhedral structure. Fullerenes may include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes include, for example, $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes are carbon based, tubular fullerene structures having open or closed ends and which may be inorganic or made entirely or partially of carbon, and may include also components such as metals, metalloids, and also ceramics. Nanotubes, including carbon nanotubes, may be single walled nanotubes (SWNTs) or multi-walled nanotubes (MWNTs).

Nanographite is a cluster of plate-like sheets of graphite, in which a stacked structure of one or more layers of the graphite, which has a plate-like two dimensional structure of fused hexagonal rings with an extended delocalized π-electron system, layered and weakly bonded to one another through π-π stacking interaction. Graphene in general, and including nanographene, may be a single sheet or several sheets of graphite having nano-scale dimensions, such as an average particle size of (average largest dimension) of less than e.g., 500 nanometers (nm), or in other embodiments may have an average largest dimension greater than 1 µm. Nanographene may be prepared by exfoliation of nanographite or by catalytic bond-breaking of a series of carbon-carbon bonds in a carbon nanotube to form a nanographene ribbon by an "unzipping" process, followed by derivatization of the nanographene to prepare, for example, nanographene oxide.

Diamondoids may include carbon cage molecules such as those based on adamantane ($C_{10}H_{16}$), which is the smallest unit cage structure of the diamond crystal lattice, as well as variants of adamantane (e.g., molecules in which other atoms (e.g., N, O, Si, or S) are substituted for carbon atoms in the molecule) and carbon cage polyadamantane molecules including between 2 and about 20 adamantane cages per molecule (e.g., diamantane, triamantane, tetramantane, pentamantane, hexamantane, heptamantane, and the like).

Polysilsesquioxanes, also referred to as polyorganosilsesquioxanes or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures). Polysilsesquioxanes, including POSS structures, may be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane.

Nanoclays may be included in the polycrystalline diamond. Nanoclays may be hydrated or anhydrous silicate minerals with a layered structure and may include, for example, alumino-silicate clays such as kaolins including hallyosite, smectites including montmorillonite, illite, and the like. Nanoclays may be exfoliated to separate individual sheets, or may be non-exfoliated, and further, may be dehydrated or included as hydrated minerals. Other mineral fillers of similar structure may also be included such as, for example, talc, micas including muscovite, phlogopite, or phengite, or the like.

Inorganic nanoparticles may also be included in the composition. Exemplary inorganic nanoparticles may include a metal or metalloid carbide such as tungsten carbide, silicon carbide, boron carbide, or the like; a metal or metalloid nitride such as titanium nitride, boron nitride, silicon nitride, or the like; a metal carbonate, a metal bicarbonate, and/or a metal nanoparticle such as iron, cobalt, nickel, an alloy comprising at least one of these, or the like.

It will be understood that, where a nanoparticle is included, the nanoparticle may be any material which, when combined with the derivatized nanodiamond and microdiamond, does not significantly adversely affect the desired properties of the polycrystalline diamond. In an embodiment, inclusion of nanoparticles further enhances desired properties of the polycrystalline diamond, such as hardness, crack/fracture resistance, substrate bonding, or other such properties.

In an embodiment, a useful nanoparticle may include a single or multi-walled carbon nanotube, nanographene, a nanodiamond, a boron nitride nanoparticle, a boron carbide nanoparticle, a silicon nitride nanoparticle, a silicon carbide nanoparticle, or a combination comprising at least one of the foregoing. In an exemplary embodiment, a useful nanoparticle is a boron nitride nanoparticle. In a specific embodiment, the boron nitride nanoparticle is a cubic boron nitride nanoparticle.

In other embodiments, the nanoparticle may also be functionalized to form a derivatized nanoparticle. For example, the nanoparticle may be coated with a boride, a carbide, a nitride, a metal carbonate, a metal bicarbonate, a non-catalytic metal, or a combination comprising at least one of the foregoing.

In addition to the derivatized nanodiamond and the microdiamond, a microparticle not identical to the microdiamond may be included.

As used herein, the term "microparticle" means and includes any particle having an average particle size of about 1 um or greater. In an embodiment, the average particle size of the microparticle about 1 µm to about 250 µm, specifically about 2 µm to about 200 µm, and more specifically about 1 µm to about 150 µm.

Microparticles, where included, may displace a corresponding amount of microdiamond. Thus in an embodiment, where an additional microparticle is used, the microparticle may be present relative to the microdiamond in a ratio of 0:100 to 99:1, specifically 5:95 to 95:5, more specifically 10:90 to 90:10, and still more specifically 25:75 to 75:25, based on the weights of microdiamond to microparticle.

Exemplary microparticles may include a micrographene, a boron nitride microparticle, a silicon nitride microparticle, a silicon carbide microparticle, or a combination comprising at least one of the foregoing.

In the method, the derivatized nanodiamond, microdiamond, and metal solvent-catalyst, as well as any additional nano- and/or microparticles and other additives, are combined to form the polycrystalline diamond. Combining may further comprise mixing a nanoparticle not identical to the derivatized nanodiamond, and a microparticle not identical to the microdiamond, with the other components. Specifically, to effect this, the components including the derivatized nanodiamond and microdiamond are first mixed in a solvent to form a suspended mixture. The solvent may be any solvent suitable for forming a suspension of these components, and may include deionized water, aqueous solutions having a pH of 2 to 10, water miscible organic solvents such as alcohols including methanol, ethanol, isopropanol, n- and t-butanol, 2-methoxyethanol (methyl cellosolve), 2-ethoxyethanol (ethyl cellosolve), 1-methoxy-2-propanol, dimethylsulfoxide, N,N-dimethylformamide, N,N-dimethylacetamide, N-methylpyrrolidone, gamma-butyrolactone, acetone, cyclohexanone, and the like, or a combination comprising at least one of the foregoing.

A binder may also be included in the slurry, to bind the derivatized nanodiamond and microdiamond to retain shape during further processing prior to sintering. Any suitable binder may be used provided the binder does not significantly adversely affect the desired properties of the polycrystalline diamond. Binders may comprise, for example, a metal material such as a cobalt containing material, a polymeric material such as a polyacrylate, or polyvinylbutyral, an organic material such as a cellulosic material, or the like. It will be understood that these binders are exemplary and are not limited to these.

In an embodiment, mixing comprises slurrying the derivatized nanodiamond, diamond precursor, and metal solvent-catalyst to form a uniform suspension. Mixing may further comprise slurrying a nanoparticle not identical to the derivatized nanodiamond, and a microparticle not identical to the microdiamond, with the other components. As used herein, "uniform" means that the composition of the slurry, analyzed at random locations in the mixing vessel, has less than 5% variation in solids content, specifically less than 2% variation in solids content, and more specifically less than 1% variation in solids content, as determined by drying a sample of the slurry. In an embodiment, the suspension has a total solids content (derivatized nanodiamond, microdiamond, and any other additives), of 0.5 to 95 wt %, specifically 1 to 90 wt %, more specifically 10 to 80 wt %, and still more specifically 10 to 50 wt %, based on the total weight of the slurry.

This suspended mixture is then heated to remove the solvent under elevated temperature. Thermally treating to remove solvent can be carried out by subjecting the mixture to a temperature of from about 400 to about 800° C., specifically about 450 to about 750° C. The thermal treating may be carried out for at least about 30 minutes, more specifically at least about 60 minutes, prior to annealing. The thermal treatment may be carried out under vacuum or at ambient pressure.

The polycrystalline diamond is formed by processing the polycrystalline diamond precursors (derivatized nanodiamonds, microdiamonds, optional nanoparticles and/or microparticles, and metal solvent-catalyst) under conditions of heating and pressure.

As disclosed herein, "processing" means sintering the components of the polycrystalline diamond with interparticle bond formation and phase transformation of non-diamond lattice interstitial regions. Such a process is referred to herein as a high-pressure, high temperature (HPHT) process, in which interparticle bonds are formed between the derivatized nanodiamond, microdiamond, and any added nano- or microparticles. Such bonds may be covalent, dispersive including van der Waals, or other bonds. Specifically, the interparticle bonds include covalent carbon-carbon bonds, and in particular $sp^3$ carbon-carbon single bonds as found in a diamond lattice, sufficient to provide the hardness and fracture resistance disclosed herein. In an HPHT process, it is believed that component phases of the derivatized nanodiamond and/or microdiamond undergo a phase change to form a diamond lattice (tetrahedral carbon) structure, and in particular, any graphitic phase (such as, e.g., that of the carbon onion and or any amorphous carbon phase present in the nanodiamond or microdiamond) that may be present can, in principle, undergo such a phase change and structural transformation from a delocalized $sp^2$ hybridized system (a delocalized π-system) as found in the graphitic (i.e., non-diamond) phase(s), to an $sp^3$ hybridized diamond lattice.

In addition to the derivatized nanodiamond and microdiamond, nucleation particles may be included in the particulate mixture. Nucleation particles may comprise any type of particle on which grains of the polycrystalline diamond will nucleate and grow during an HTHP process, and may include, for example, fullerenes, diamondoids, amorphous carbon nanoparticles, graphite nanoparticles, or a combination comprising at least one of the foregoing. Ions may also be implanted into fullerene molecules, and such ion-implanted fullerenes. For example, ions of metals such as, for example, cobalt, iron, or nickel may be implanted into fullerene molecules and included as nucleation particles.

In another embodiment, when forming a polycrystalline diamond, carbon (e.g., graphite or amorphous carbon) can also be included as a carbon source additive to form an interparticle diamond phase.

In an embodiment, heating to effect sintering is carried out at a temperature of greater than or equal to about 1,000° C., and specifically greater than or equal to about 1,200° C. In an embodiment, the temperature used may be from about 1,200° C. to about 1,700° C., specifically from about 1,300° C. to about 1,650° C. The pressure used in processing may be greater than or equal to about 5.0 gigapascals (GPa), specifically greater than or equal to about 6.0 GPa, and more specifically greater than or equal to about 6.5 GPa. Processing may be carried out for 1 second to 1 hour, specifically for 1 second to 10 minutes, and still more specifically for 1 second to 2 minutes.

Thus, in an embodiment, combining further comprises sintering by subjecting the mixture to a pressure greater than about 5.0 GPa and a temperature greater than about 1,000° C., for a time of about 1 second to about 1 hour.

The composition includes a metal solvent-catalyst. As disclosed herein, the metal solvent catalyst acts to catalyze the carbon-carbon bond formation reaction. The metal solvent-catalyst catalyzes the formation of diamond-to-diamond bonds between the microdiamond and the nanodiamond and between individual nanodiamond particles to form the polycrystalline diamond. In an embodiment, the metal solvent-catalyst is a suitable transition metal and may comprise Ni, Fe, Co, Cr, Ru, Os, Mn, V, alloys thereof, or a combination comprising at least one of the foregoing. In a specific embodiment, the metal solvent-catalyst is a Group VIIIA element (e.g., iron, cobalt, or nickel), an alloy thereof, or a combination comprising at least one of the foregoing. In an exemplary embodiment, the metal solvent-catalyst comprises Co, an alloy thereof, or a combination comprising at least one of the foregoing.

In additional embodiments, the catalyst material may further, or alternatively comprise a carbonate material such as, for example, a carbonate of one or more of Mg, Ca, Sr, and Ba. Carbonates may also be used to catalyze the formation of polycrystalline diamond. Exemplary carbonates include magnesium carbonate, calcium carbonate, strontium carbonate, barium carbonate, or a combination comprising at least one of the foregoing. A combination comprising at least one of the foregoing metals and carbonates may be used.

The polycrystalline diamond prepared by the method may include the metal solvent-catalyst in an amount of about 0.1% to about 30% by weight.

A polycrystalline diamond prepared by the method may be a superabrasive for use in an article such as a cutting tool, such as a drill bit for an earth-boring apparatus. As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits and other drilling bits and tools known in the art.

In an embodiment, a method of making a superabrasive article (e.g., a drill bit), comprising forming a superabrasive polycrystalline diamond compact in an HPHT process by combining a nanodiamond derivatized to include functional groups, a microdiamond, and a metal solvent-catalyst; combining the polycrystalline diamond with a support, wherein the microdiamond has an average particle size greater than that of the derivatized nanodiamond, and removing the metal solvent-catalyst.

The polycrystalline diamond surface may be affixed to a substrate to form a polycrystalline diamond compact (PDC) which in turn is attached to a support such as a drill head. The substrate may be a ceramic material. Polycrystalline diamond integrated onto such a substrate may also be referred to as a diamond table. In an embodiment, polycrystalline diamond may be formed on a supporting substrate of cemented tungsten carbide or another suitable substrate material in a conventional HTHP process as described, for example, in U.S. Pat. No. 3,745,623, or may be formed as a free-standing polycrystalline diamond compact without a supporting substrate, formed in a similar conventional HTHP process as described, for example, in U.S. Pat. No. 5,127,923, the disclosure of each of which patents is incorporated herein by reference in its entirety. In an embodiment, the metal solvent-catalyst may be supplied from the supporting substrate during an HTHP process used to form the polycrystalline diamond. For example, the substrate may include a cobalt-cemented tungsten carbide material. The cobalt of the cobalt-cemented tungsten carbide may serve as the metal solvent-catalyst during the HTHP process.

Figure 2:
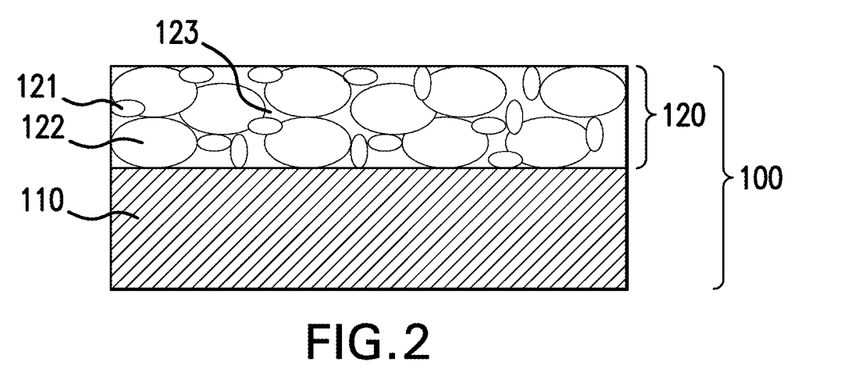
FIG. 2 is a cross-sectional view of an exemplary polycrystalline diamond compact (PDC)

FIG. 2 illustrates an exemplary a polycrystalline diamond 130 incorporated into a polycrystalline diamond compact 100. In FIG. 2, a support 110, has a polycrystalline diamond 120 disposed on a surface of the support 110. The substrate support 110 may be formed of, for example, tungsten carbide or other suitable substrate material. Also, in an exemplary embodiment, the metal solvent-catalyst is cobalt or a cobalt alloy, where, during the sintering process, the metal solvent-catalyst intercalates into the forming interstitial spaces 123 by wetting and capillary action, which exist throughout the polycrystalline diamond 120 between the previously derivatized nanodiamonds 121 and the microdiamonds 122. It will be understood that during formation of the polycrystalline diamond 120 and/or during sintering of polycrystalline diamond 120, the functional groups present on the previously derivatized nanodiamonds 120 undergo thermal degradation under the high temperatures exceeding 900° C. used in the HPHT process, and sufficient to soften and/or melt the metal solvent-catalyst (e.g., where cobalt, which may be used as the metal solvent-catalyst is softened at a temperature of about 1,450° C.), and the previously derivatized nanodiamonds 121 and the microdiamonds 122 form interparticle bonds between the previously derivatized nanodiamonds, microdiamonds, nano- and microdiamonds, and any other nano- and/or microparticles or diamond-phases that may form during sintering. In a further embodiment, the metal solvent-catalyst may be wholly or partially removed from the polycrystalline diamond by, for example, a leaching process, to provide a PDC with reduced amounts of interstitial metal (i.e., from the metal solvent-catalyst).

In additional embodiments, amorphous carbon layers may be formed on particles of Ni, Pt, Cu, Fe, Co, Mo, Mg, Ag, Ti, Nb, Y, and Si to facilitate diamond nucleation and formation of the carbon-carbon interparticle bond. Alternatively, the amorphous carbon layers may be included on a material that does not readily form a carbide compound such as, for example, Cu or Au.

A method of forming a polycrystalline diamond comprises processing a suspension under heat and pressure and in the presence of a metal solvent-catalyst, the suspension comprising as components: a nanodiamond having an average particle size of 1 to 500 nm and derivatized to include functional groups comprising alkyl, alkenyl, alkynyl, carboxyl, hydroxyl, amino, amido, epoxy, keto, alkoxy, ether, ester, lactones, metallic groups, organometallic groups, polymeric groups, ionic groups, or a combination comprising at least one of the foregoing, a microdiamond having a size greater than that of the derivatized nanodiamond, and a solvent, wherein the components are more homogeneously distributed throughout the suspension than when a non-derivatized nanodiamond is included in place of the derivatized nanodiamond. The derivatized nanodiamonds and the microdiamonds, and any added nanoparticles or microparticles, may remain homogeneously distributed after processing to form the polycrystalline diamond. Alternatively, the derivatized nanodiamonds and the microdiamonds, and any added nanoparticles or microparticles, may adopt a gradient structure where the particle sizes of the constituent derivatized nanodiamonds and microdiamonds, and any other particles therein, stratify to form zones in which the microdiamonds distribute closer to the catalyst (table), and the nanodiamonds distribute to the surface, with intermediate, e.g., sub-micron sized, nanoparticles distributing to the middle of the polycrystalline diamond. Such a gradient structure for a polycrystalline diamond is described in U.S. Provisional Patent Application No. 61/373,617, filed Aug. 13, 2010, and entitled "Cutting Elements Including Nanoparticles in At Least One Portion Thereof, Earth-Boring Tools Including Such Cutting Elements, and Related Methods", the disclosure of which provisional patent application is incorporated herein in its entirety by this reference.

The metal solvent-catalyst catalyzes the formation of the interparticle bonds between the functionalized nanodiamonds and microdiamonds during the HTHP process. During the HTHP process, the metal solvent-catalyst may intrude or intercalate into the interstitial spaces in the polycrystalline diamond as it is forming the interstitial lattice and carbon-carbon bonds, wicking upwards from the ceramic surface into the porous interstitial structure of the polycrystalline diamond as it forms. In this way, the resulting metallic intrusions may act to interconnect and adhere the underlying ceramic substrate to the polycrystalline diamond and bond the polycrystalline diamond to the ceramic substrate, thereby forming a thermally stable diamond table.

After the HTHP process, the metal solvent-catalyst (e.g., cobalt) remains in the interstitial spaces, which may be open or closed cell pores, between the inter-bonded particles. Some of the metal solvent-catalyst may become entrapped in closed-cell pores within the body of the polycrystalline diamond or PDC and some of the metal solvent-catalyst remains in the more open-cell pores of the polycrystalline diamond.

Such metal solvent-catalyst may be removed from the polycrystalline diamond after the HTHP process. A leaching process may be used to remove at least a portion of, or substantially all of, the metal solvent-catalyst from the interstitial spaces between the inter-bonded grains within the polycrystalline diamond. As used herein, "substantially all" means having a total amount of metal solvent-catalyst in the leached regions of the polycrystalline diamond of less than about 5 wt %, specifically less than or equal to 4 wt %, still more specifically less than or equal to 3 wt %, based on the weight of metal per unit volume of leached region of the polycrystalline diamond. In another embodiment, the polycrystalline diamond contains at least about 1.5 wt % weight of metal per unit volume of the polycrystalline diamond.

In one embodiment, the polycrystalline diamond may be leached using a leaching agent and process such as those described more fully in, for example, U.S. Pat. No. 5,127, 923 and U.S. Pat. No. 4,224,380, the disclosure of each of which patent is incorporated herein by reference in its entirety.

For example, aqua regia, which is a mixture of concentrated nitric acid ($HNO_3$) and concentrated hydrochloric acid (HCl), in any effective proportion such as, for example, in a 1:3 (v/v) ratio, may be used to at least remove substantially all catalyst material from the interstitial spaces between the inter-bonded grains in the polycrystalline diamond. Alternatively, boiling hydrochloric acid (HCl) and/or boiling hydrofluoric acid (HF) may be used as leaching agents. In an exemplary embodiment, a useful leaching agent is hydrochloric acid (HCl) heated to a temperature of greater than 110° C., which may be provided in contact with the polycrystalline diamond for about 20 min to about 1,000 hours or even greater, depending upon the size of the body including the polycrystalline diamond, and the extent of leaching desired in the polycrystalline diamond.

Thus, in an embodiment, leaching comprises immersing the polycrystalline diamond compact in hydrochloric acid, hydrofluoric acid, nitric acid, or a combination comprising at least one of the foregoing, at a temperature at or greater than 20° C.

After leaching the metal solvent-catalyst from the polycrystalline diamond, the interstitial spaces between the inter-bonded grains within the polycrystalline diamond may be free of substantially all catalyst material used to catalyze formation of inter-particle bonds between the grains in the polycrystalline diamond.

The overall microstructure in the polycrystalline diamond that may be achieved in accordance with the method disclosed herein may result in polycrystalline diamonds and PDCs that exhibit improved durability and thermal stability.

While one or more embodiments have been shown and described, modifications and substitutions may be made thereto without departing from the spirit and scope of the invention. Accordingly, it is to be understood that the present invention has been described by way of illustrations and not limitation. The above embodiments are further illustrated in the following examples.

EXAMPLES

A commercially available nanodiamond cluster (75 mg, having an average particle size of about 75 nm, available from NanoDiamond Products) is suspended in 100 ml of liquid ammonia in a dry ice/acetone bath. Lithium metal (175 mg) is added to the liquid ammonia solution, whereupon the solution attains a blue color indicating dissolution of the lithium metal. When the addition of lithium is complete, the solution is stirred for 30 minutes, and 1-iodododecane ($I-CH_2-(CH_2)_{10}-CH_3$) (6.5 ml) is then added slowly to the ammonia slurry of metalized nanodiamond. The resulting solution is allowed to react for four hours at room temperature. after which ammonia is slowly removed to isolate the solid product. The resulting solid material is isolated to yield 1-dodecyl derivatized nanodiamond.

Figure 3:
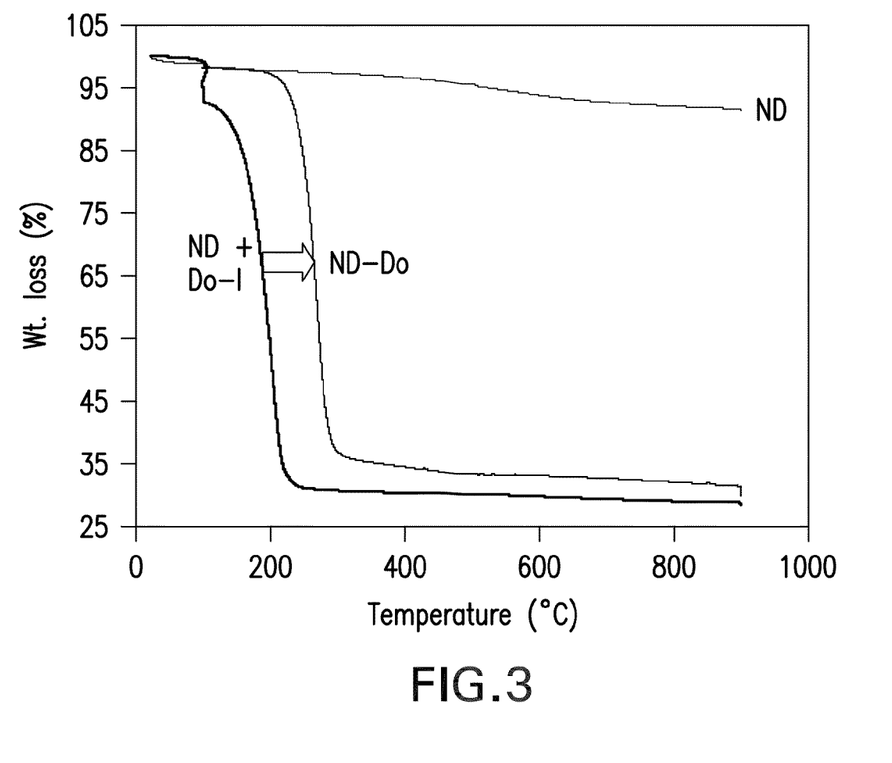
FIG. 3 is a comparative thermogravimetric analysis (TGA) plot showing TGA performance of nanodiamond (ND), nanodiamond in admixture with 1-iodododecane (ND+Do-I), and n-dodecyl modified nanodiamond (Do-ND)

Thermogravimetric analysis (TGA). The functionalized nanodiamond is evaluated by TGA to confirm the presence of covalently bound n-dodecyl groups. FIG. 3 shows a comparative thermogravimetric analysis (TGA) plot of weight loss versus temperature, showing TGA performance of nanodiamond (ND), nanodiamond in a mechanically-mixed admixture with 1-iodododecane (ND+Do-I), and n-dodecyl-modified nanodiamond (Do-ND). In FIG. 3, it can be seen that the nanodiamond control (ND) does not exhibit significant change in weight with increasing temperature, where both the nanodiamond-1-iodododecane admixture and the dodecyl-modified nanodiamond each show a weight loss with increasing temperature. The TGA plot, obtained at a heating rate of 10° C./minute, shows a clear increase in degradation temperature from the admixture of ND+Do-I, with an onset temperature of about 100° C. and a maximum rate of change at about 190° C., to ND-Do, with an onset temperature of about 200° C. and a maximum rate of change at about 260° C. Thus, based on the comparison, it can be seen that the dodecyl groups are bound (e.g., covalently) to the nanodiamond after derivatization.

Figure 4A:
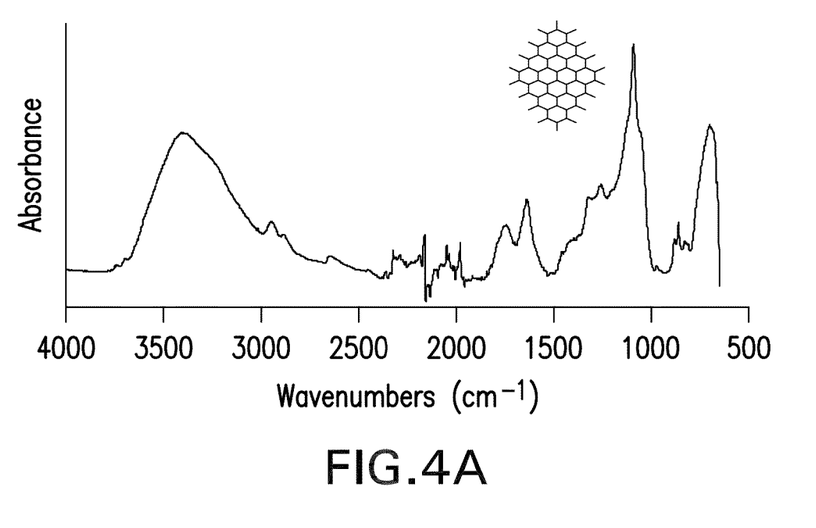
FIGS. 4A and 4B show Fourier Transform Infrared Spectrophotometry (FT-IR) spectra for the unmodified nanodiamond (FIG. 4A) and for the n-dodecyl modified nanodiamond (FIG. 4B)
Figure 4B:
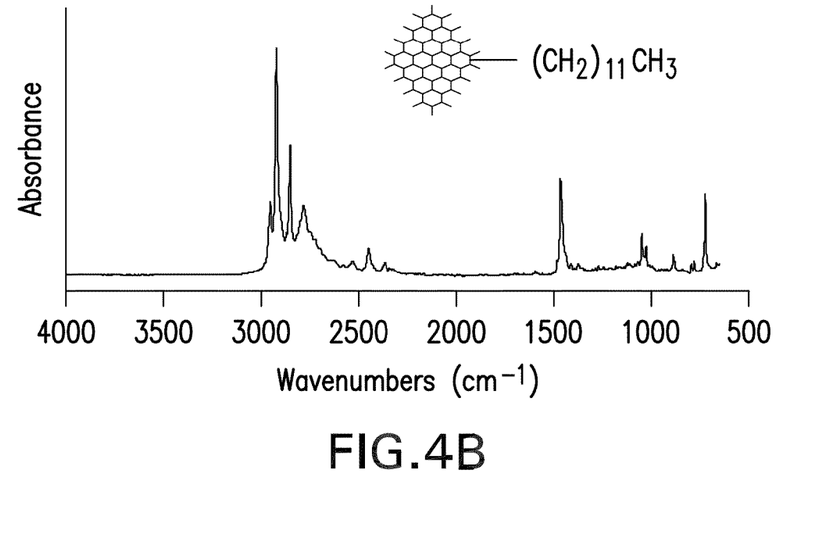

Infrared analysis (IR). A comparison of the infrared spectra using a Fourier Transform Infrared Spectrophotometer (FT-IR) is shown in FIG. 4 for the unmodified nanodiamond (FIG. 4A) and for the n-dodecyl modified nanodiamond (FIG. 4B). In FIG. 4A, the nanodiamond prior to derivatization has a complex spectrum including associated water O—H stretching at about 3300 $cm^{-1}$ and C—H olefinic stretching at >3000 $cm^{-1}$ as well as C—H alkyl stretching at <3000 $cm^{-1}$, carboxylic acid and anhydride carbonyl stretching at about 1700-1800 $cm^{-1}$, and C=C stretching at about 1600-1670 $cm^{-1}$, whereas after derivatization, the FT-IR spectrum shown for the dodecyl-modified nanodiamond in FIG. 4B shows prominent and sharp new peaks at 2800-2980 $cm^{-1}$ and 725-1470 $cm^{-1}$, corresponding to alkyl C—H stretch and deformation modes, respectively. Thus it can be clearly seen in the FT-IR spectra that the nanodiamond has been derivatized to include dodecyl groups.

Figure 5A:
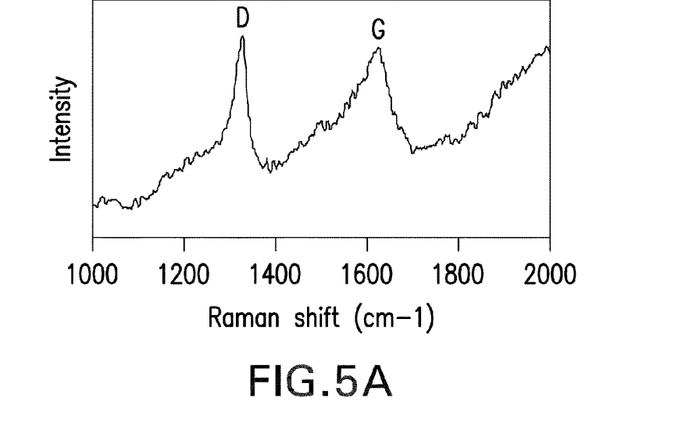
FIGS. 5A to 5C show the Raman IR spectra of as received nanodiamonds (FIG. 5A), nanodiamonds after being derivatized with dodecyl groups (FIG. 5B) and of post-TGA nanodiamonds (FIG. 5C)
Figure 5B:
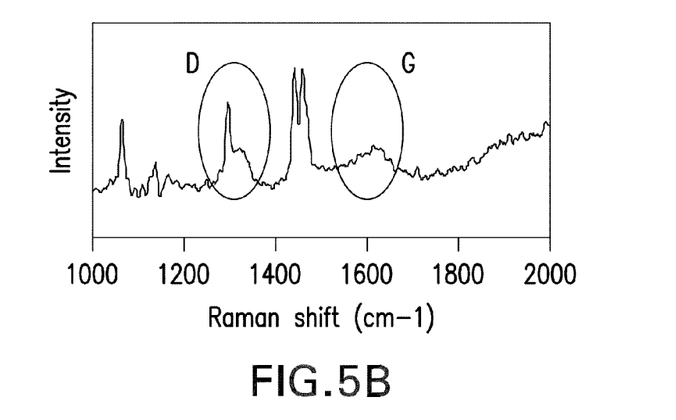
Figure 5C:
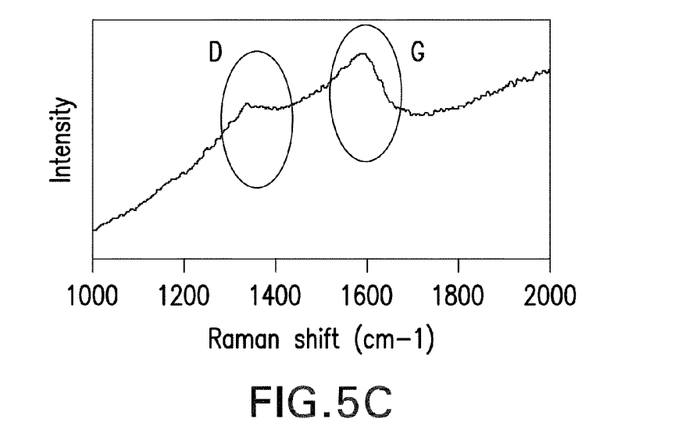

Reaction validation study by Raman Spectroscopy. FIGS. 5A to 5C show the Raman IR spectra of as received nanodiamonds (FIG. 5A), nanodiamonds after being derivatized with dodecyl groups (FIG. 5B) and of post-TGA nanodiamonds (FIG. 5C). FIG. 5A shows peaks at 1325 and 1623 $cm^{-1}$ corresponding to the D-band (disorder band) and G-band (graphitic band) of the nanodiamond, respectively. Upon derivatization, and as expected, the intensity of the G-band (at 1294 $cm^{-1}$ in FIG. 4B) decreases significantly with respect to the intensity of the D-band (at 1610 $cm^{-1}$ in FIG. 4B). The additional bands between 1200-1600 $cm^{-1}$ correspond to the presence of the dodecyl group after derivatization of the nanodiamond (see, e.g., Raman Spectrum of 1-Bromo-Dodecane, *J. Chem. Phys*, 1968, vol. 8, p. 867). However, upon heating at high temperature, the derivatized nanodiamond loses the functional groups resulting in increase of the G-band intensity with respect to the D-band intensity (FIG. 5C). Thus inclusion of the functional groups is useful for improving solvent dispersibility but does not necessarily form a part of the polycrystalline diamond component after sintering.

Formation of a Polycrystalline Diamond Compact (PDC) Using Derivatized Nanodiamond.

A slurry of nanodiamonds having an average cluster size of 75 nm were derivatized by the aforementioned process and combined with a slurry of microdiamonds having an average particle size of 4 micrometers. The microdiamonds were stabilized in a solution by inclusion of a solvent, dispersant, and binder. The two separate solutions were mixed and subsequently dried to remove excess solvent. A derivatized nanodiamond PDC is formed from the dried mixture of microdiamond particles in which the microdiamonds constitute about 90 to 95 weight percent of the mixture (based on the combined weight of nanodiamond and microdiamond), with the remainder of particles being the derivatized nanodiamond. The solid mixture of microdiamond and derivatized nanodiamond particles was placed onto a cobalt-cemented tungsten carbide substrate for forming the PDC. The mixture and substrate were then placed in a niobium can which was in turn placed in a standard high-pressure cell suitable for HPHT processes. The can with diamond particle mixture is sintered at a temperature of about 1,400 to 1,550° C. and at a pressure of about 4.2 to 6 GPa for about 90 seconds to form the derivatized nanoparticle enhanced PDC.

A comparative PDC was formed using only the microdiamond slurry as a base composition (where the microdiamonds constituted 100 wt % of the solid mixture), and another comparative PDC was formed from a combination of a slurry of the nanodiamonds (underivatized) and the microdiamond slurry. Both comparative PDCs were prepared using identical processes.

Figure 6:
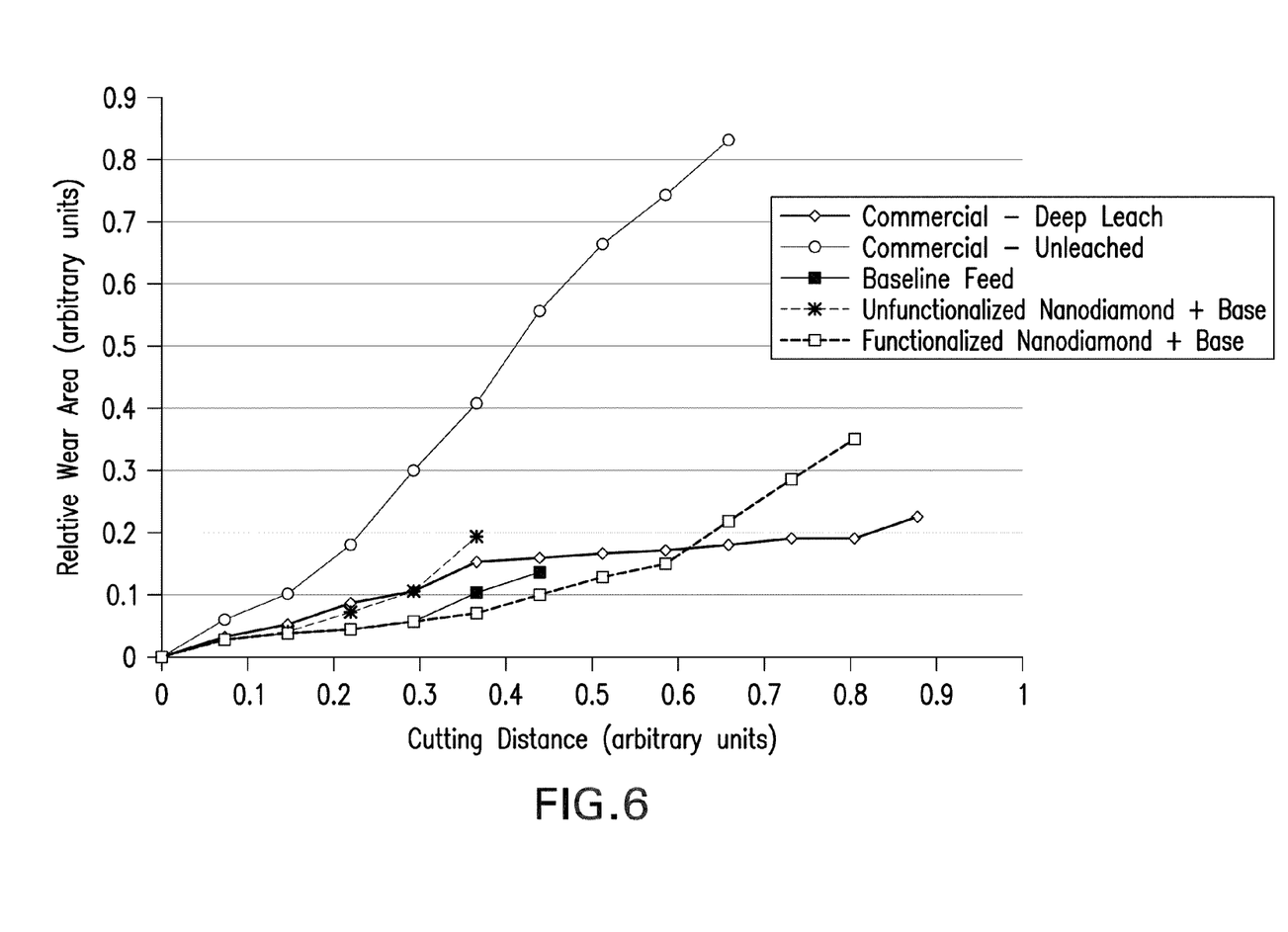
FIG. 6 is a comparative plot of relative wear area versus cutting distance for exemplary polycrystalline diamond prepared with a derivatized nanodiamond and a microdiamond, and comparative polycrystalline diamonds prepared with a non-derivatized nanodiamond and microdiamond, microdiamond only, a commercial polycrystalline diamond, and a "leached" commercial polycrystalline diamond.

FIG. 6 shows a comparative plot of relative wear area (arbitrary units) versus cutting distance (arbitrary units) for an unleached commercial PDC ("Commercial—Unleached"), a commercial PDC deep leached to remove catalyst ("Commercial—Deep Leach"), the baseline PDC prepared with only the microdiamonds ("Baseline Feed"), the PDC prepared using unfunctionalized nanodiamonds plus microdiamonds ("Unfunctionalized Nanodiamond+Base"), and the PDC prepared using the functionalized nanodiamonds plus microdiamonds ("Functionalized Nanodiamond+Base"). As seen in the plot, the unfunctionalized nanodiamond PDC deviates sharply from the functionalized nanodiamond PDC, reaching a relative wear of about 0.2 in a cutting distance of about 0.37, where the functionalized nanodiamond PDC does not incur the same degree of wear until reaching a cutting distance of about 0.64. The baseline PDC with only microdiamonds shows an intermediate wear resistance between that of the unfunctionalized nanodiamond PDC and the functionalized nanodiamond PDC.

The unleached commercial PDC shows significant wear per cutting distance, reaching a relative wear of about 0.2 by a cutting distance of about 0.23 and showing almost linear wear up to 0.84 relative units out to a cutting distance of about 0.66. While the deep leached commercial PDC shows the least overall wear of about 0.23 out to a cutting distance of about 0.88, the functionalized nanodiamond PDC showed the lowest initial wear with the lowest slope, at a total wear of about 0.7 to a cutting distance of about 0.36 (compare to the deep leached commercial PDC which showed more than twice the wear at 0.16 in the same cutting distance). Further, the functionalized nanodiamond PDC showed less wear than the deep leached commercial PDC out to a cutting distance of about 0.62.

From these results, it can be seen that the initial [AD1] and abrasion resistance of a PDC prepared with a derivatized nanodiamond has significantly improved wear resistance performance over that of an exemplary commercial PDC, a PDC prepared using microdiamonds alone, or a PDC prepared using underivatized nanodiamonds and microdiamonds. Further, the initial wear resistance of the PDC prepared using derivatized nanodiamonds and microdiamonds, and which was not deep leached, is still superior to that of a deep-leached commercial PDC.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of forming a polycrystalline diamond, comprising:
    disposing a first functional group on a plurality of nanodiamonds by a chemical reaction to form derivatized nanodiamonds that contain functional groups comprising alkyl, alkenyl, alkynyl, amido, epoxy, keto, alkoxy, ether, ester, or lactones, metallic groups, organometallic groups, or a combination comprising at least one of the foregoing, the derivatized nanodiamonds derivatized without direct halogenation;
    combining the derivatized nanodiamonds with a plurality of microdiamonds having an average particle size greater than that of the derivatized nanodiamonds, and a metal solvent-catalyst; and
    forming a polycrystalline diamond from the derivatized nanodiamonds, the microdiamonds and the metal solvent catalyst.

2. The method of claim 1 wherein the derivatized nanodiamonds include a first functional group comprising alkyl, alkenyl, alkynyl, carboxyl, hydroxyl, amino, amido, epoxy, keto, alkoxy, ether, ester, lactones, metallic groups, organometallic groups, polymeric groups, ionic groups, or a combination comprising at least one of the foregoing.

3. The method of claim 1 wherein the nanodiamonds have an average particle size of 1 nm to less than 1 µm.

4. The method of claim 1, wherein the microdiamonds have an average particle size of greater than or equal to 1 µm.

5. The method of claim 1, wherein the average particle size of the microdiamonds is at least about 10 times greater than the average particle size of the derivatized nanodiamonds.

6. The method of claim 1, wherein the polycrystalline diamond comprises 0.001 to 90 wt% of derivatized nanodiamonds based on the total weight of the derivatized nanodiamonds, microdiamonds, and metal solvent-catalyst.

7. The method of claim 1, wherein the microdiamonds are derivatized to include a second functional group comprising alkyl, alkenyl, alkynyl, carboxyl, hydroxyl, amino, amido, epoxy, keto, alkoxy, ether, ester, lactones, metallic groups, organometallic groups, polymeric groups, ionic groups, or a combination comprising at least one of the foregoing.

8. The method of claim 1, further comprising a plurality of nanoparticles not identical to the derivatized nanodiamonds, a plurality of microparticles not identical to the microdiamonds, or a combination comprising at least one of the foregoing.

9. The method of claim 8, wherein the nanoparticles comprise fullerene, nanographite, nanographene, graphene oxide, nanotube, adamantane, diamondoid, nanodiamond, polysilsesquioxane, nanoclay, or inorganic nanoparticles, or combinations comprising at least one of the foregoing.

10. The method of claim 9, wherein the nanoparticles comprise single-wall carbon nanotube, multi-walled carbon nanotube, metal, metal or metalloid carbide, metal or metalloid nitride, metal carbonate, or metal bicarbonate nanoparticles, or a combination comprising at least one of the foregoing.

11. The method of claim 8 wherein the nanoparticles are derivatized nanoparticles not identical to the derivatized nanodiamonds.

12. The method of claim 8, wherein the microparticles comprise micrographite, carbon fiber, boron nitride, microdiamond, silicon carbide, or tungsten carbide microparticles, or a combination comprising at least one of the foregoing.

13. The method of claim 12, wherein the microparticles are derivatized microparticle.

14. The method of claim 1, wherein combining comprises:
mixing the derivatized nanodiamonds, microdiamonds, and metal solvent-catalyst in a solvent to form a suspended mixture,
forming a polycrystalline diamond precursor by removing the solvent, and
forming the polycrystalline diamond from the polycrystalline diamond precursor by processing the polycrystalline diamond precursor under conditions of heating and pressure.

15. The method of claim 14, where combining further comprises mixing nanoparticles not identical to the derivatized nanodiamonds, microparticles not identical to the microdiamonds, or a combination comprising at least one of the foregoing.

16. The method of claim 14, wherein the suspension has a homogeneity greater than a suspension in which a non-derivatized nanodiamond is included in place of the derivatized nanodiamond.

17. The method of claim 16, where mixing further comprises slurrying a nanoparticle not identical to the derivatized nanodiamond, a microparticle not identical to the microdiamond, or a combination comprising at least one of the foregoing.

18. The method of claim 14, wherein heating is at a temperature of greater than or equal to about 1,000° C., the pressure is greater than or equal to about 5 gigapascals (GPa), and processing is carried out for 1 second to 1 hour.

19. The method of claim 1, where in the metal solvent-catalyst comprises a metal comprising Ni, Fe, Co, Cr, Ru, Os, Mn, V, alloys thereof, or a combination comprising at least one of the foregoing; magnesium carbonate, calcium carbonate, strontium carbonate, barium carbonate, or a combination comprising at least one of the foregoing; or a combination comprising at least one of the foregoing metals and carbonates.

20. The method of claim 1, wherein the polycrystalline diamond comprises a superabrasive.

21. The method of claim 1, wherein the polycrystalline diamond comprises an article.

22. The method of claim 21, wherein the article is a cutting tool.

23. The method of claim 1 wherein the derivatized nanodiamonds include a first functional group comprising an alkyl group.

24. A method of making an article, comprising
forming a superabrasive polycrystalline diamond compact by combining:
a plurality of nanodiamonds derivatized by disposing a first functional group on the plurality of nanodiamonds by a chemical reaction to form derivatized nanodiamonds comprising functional groups containing alkyl, alkenyl, alkynyl, amido, epoxy, keto, alkoxy, ether, ester, or lactones, metallic groups, organometallic groups, or a combination comprising at least one of the foregoing, the derivatized nanodiamonds derivatized without direct halogenation,
a plurality of microdiamonds having an average particle size greater than that of the derivatized nanodiamonds, and
a metal solvent-catalyst;
combining the polycrystalline diamond with a substrate comprising a ceramic; and
removing a portion of the metal solvent-catalyst from the polycrystalline diamond compact by leaching.

25. The method of claim 24, where leaching comprises immersing the polycrystalline diamond compact in hydrochloric acid, hydrofluoric acid, nitric acid, or a combination comprising at least one of the foregoing, at a temperature of greater than 100° C.

26. The method of claim 25, wherein the article is a cutting tool.

27. A method of forming a polycrystalline diamond comprising:
processing a suspension under heat and pressure, the suspension comprising as components:
a plurality of nanodiamonds having an average particle size of 1 to 500 nm and derivatized by a chemical reaction to include functional organic groups comprising alkyl, alkenyl, alkynyl, amido, epoxy, keto, alkoxy, ether, ester, or lactones, metallic groups, organometallic groups, or a combination comprising at least one of the foregoing, wherein the nanodiamonds are derivatized without direct halogenation,
a plurality of microdiamond having an average particle size greater than that of the derivatized nanodiamond,
a metal catalyst,
a solvent, and
a binder,
wherein the components are more homogeneously distributed throughout the suspension than when a non-derivatized nanodiamond is included in place of the derivatized nanodiamond.

* * * * *